(12) United States Patent
Turtinen et al.

(10) Patent No.: US 12,342,380 B2
(45) Date of Patent: Jun. 24, 2025

(54) DETERMINATION OF CONTENTION RESOLUTION TIMER

(71) Applicant: Nokia Technologies Oy, Espoo (FI)

(72) Inventors: Samuli Turtinen, Ii (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 13 days.

(21) Appl. No.: 17/135,019

(22) Filed: Dec. 28, 2020

(65) Prior Publication Data
US 2021/0266971 A1    Aug. 26, 2021

(30) Foreign Application Priority Data

Feb. 21, 2020    (WO) ................ PCT/CN2020/076188

(51) Int. Cl.
*H04W 74/0833*    (2024.01)
(52) U.S. Cl.
CPC .............................. *H04W 74/0833* (2013.01)
(58) Field of Classification Search
CPC ......... H04W 74/0833; H04W 74/0841; H04W 74/002; H04W 74/08; H04W 72/02
See application file for complete search history.

(56) References Cited

U.S. PATENT DOCUMENTS

| | | |
|---|---|---|
| 2014/0376425 A1 | 12/2014 | Han et al. |
| 2018/0199381 A1 | 7/2018 | Rong et al. |
| 2019/0387541 A1 | 12/2019 | Agiwal et al. ................... 74/85 |
| 2020/0053779 A1* | 2/2020 | Jeon ..................... H04W 74/02 |
| 2020/0107369 A1* | 4/2020 | Jeon .................... H04W 74/006 |
| 2020/0221506 A1* | 7/2020 | Jeon .................. H04W 74/0808 |
| 2022/0287080 A1* | 9/2022 | Liu ........................ H04L 5/0094 |
| 2022/0287107 A1* | 9/2022 | Kim ................... H04W 72/0453 |

FOREIGN PATENT DOCUMENTS

| | | |
|---|---|---|
| CN | 110312312 A | 10/2019 |
| CN | 110536403 A | 12/2019 |
| CN | 110771248 A | 2/2020 |

(Continued)

OTHER PUBLICATIONS

Motorola Mobility NPL "Physical channel design for 2-step RACH", 3GPP R1-1800727, Jan. 22-26, 2018 (Year: 2018).*

(Continued)

*Primary Examiner* — Chuong M Nguyen
(74) *Attorney, Agent, or Firm* — McCarter & English, LLP

(57) ABSTRACT

Example embodiments of the present disclosure relate to a solution for determining a contention resolution timer. In an aspect, a first device receives, from a second device, an indication to perform Msg3 transmission. The first device transmits, to the second device, information of the first device for contention resolution. In case a configuration of a 4-step random access channel is unavailable in an active bandwidth part for the first device, the first device determines a duration for monitoring a contention resolution message based on one of: a first configuration of a 2-step random access channel in the active bandwidth part, or a second configuration of a 4-step random access channel in a bandwidth part different from the active bandwidth part. Example embodiments of the present disclosure can improve the performance of a random access procedure.

18 Claims, 6 Drawing Sheets

(56) References Cited

FOREIGN PATENT DOCUMENTS

| WO | 2016/116065 A1 | 7/2016 | | |
| WO | 2018/062925 A1 | 4/2018 | | |
| WO | WO-2018/085726 A1 | 5/2018 | | |
| WO | WO-2019245779 A1 | * | 12/2019 | ............ H04W 72/12 |
| WO | 2020/034319 A1 | 2/2020 | | |
| WO | WO-2020167083 A1 | * | 8/2020 | .......... H04W 72/042 |

OTHER PUBLICATIONS

Apple "Open issues on 2-step RACH", 3GPP R2-2000586, Feb. 24, 2020 (Year: 2020).*

CATT "Consideration on 2-step RA", 3GPP R2-1700205, Jan. 17-19, 2017 (Year: 2017).*

Samsung "Handling PDCCH Order Initiated CFRA", 3GPP R2-2000220, Feb. 24-28, 2020 (Year: 2020).*

Apple "Open issues on 2-step RACH", 3GPP R2-2000586, Feb. 24-Mar. 6, 2020, available for retrieval from the internet on Feb. 13, 2020 (Year: 2020).*

Motorola Mobility "Physical channel design for 2-step RACH", 3GPP R1-1800727, Jan. 22-26, 2018 (Year: 2018).*

"Revised work item proposal: 2-step RACH for NR", 3GPP TSG RAN Meeting #83, RP-190711, Agenda: 9.4.7, ZTE Corporation, Mar. 18-21, 2019, 4 pages.

"Remaining stage-2 open issues for 2-step RACH", 3GPP TSG-RAN WG2 Meeting #107bis, R2-190xxxx, Agenda: 11.13.5, OPPO, Oct. 14-18, 2019, pp. 1-4.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

International Search Report and Written Opinion received for corresponding Patent Cooperation Treaty Application No. PCT/CN2020/076188, dated Nov. 17, 2020, 9 pages.

"2 step and 4 step RACH", 3GPP TSG-RAN WG1 #87, R1-1612033, Agenda: 7.1.2.4, Qualcomm Incorporated, Nov. 14-18, 2016, 3 pages.

"Physical channel design for 2-step RACH", 3GPP TSG RAN WG1 Meeting AH 1801, R1-1800727, Agenda: 7.1.4.1, Motorola Mobility, Jan. 22-26, 2018, pp. 1-4.

Office action received for corresponding Finnish Patent Application No. 20206296, dated Jun. 11, 2021, 6 pages.

"Consideration on 2-step RA", 3GPP TSG RAN WG2 Meeting Ad Hoc, R2-1700205, Agenda Item: 3.2.1.4, CATT, Jan. 17-19, 2017, 6 pages.

"Configuration of 2-step RA", Ericsson, 3GPP TSG-RAN WG2 RAN2#107bis, R2-1912680, Oct. 2019, 8 pages.

"Open Issues on 2-step RACH", Apple, 3GPP TSG-RAN WG2 Meeting #109 electronic, R2-2000586, Mar. 2020, 3 pages.

"Handling PDCCH Order Initiated CFRA", Samsung, 3GPP TSG-RAN WG2 Meeting #109, R2-2000220, Feb. 2020, 5 pages.

* cited by examiner

DETERMINATION OF CONTENTION RESOLUTION TIMER

RELATED APPLICATION

This application claims priority from PCT Application No.: PCT/CN2020/076188 filed on Feb. 21, 2020, which is hereby incorporated in its entirety.

FIELD

Example embodiments of the present disclosure generally relate to the field of communication, and in particular to devices, methods, apparatuses and a computer readable medium for determining a contention resolution timer.

BACKGROUND

In wireless communications, a terminal device can perform a random access procedure with a network device to obtain access to a wireless network. The random access procedure may be triggered by a number of events, for example, an initial access from RRC_IDLE, an radio resource control (RRC) Connection Re-establishment procedure, downlink (DL) or uplink (UL) data arrival during RRC_CONNECTED when UL synchronisation status is "non-synchronised," UL data arrival during RRC_CONNECTED when there are no physical uplink control channel (PUCCH) resources for scheduling request (SR) available, an SR failure, a request by RRC upon synchronous reconfiguration (such as handover), a transition from RRC_INACTIVE, to establish time alignment for a secondary Timing Advance Group (TAG), a request for other system information (SI), a beam failure recovery, and so on.

Currently, two types of random access procedure are supported: 4-step RA type and 2-step RA type. Both types of RA procedure support contention-based random access (CBRA) and contention-free random access (CFRA). CFRA with 2-step RA type is only supported for handover. However, various details of some aspects of the 2-step RA type have not been specified and need to be clarified.

SUMMARY

In general, example embodiments of the present disclosure provide a solution for determining a contention resolution timer.

In a first aspect, there is provided a first device. The first device comprises at least one processor and at least one memory storing computer program codes. The at least one memory and the computer program codes are configured, with the at least one processor, to cause the first device to receive, from a second device, an indication to perform Msg3 transmission. The at least one memory and the computer program codes are also configured, with the at least one processor, to cause the first device to transmit, to the second device, information of the first device for contention resolution. The at least one memory and the computer program codes are further configured, with the at least one processor, to cause the first device to, in case a configuration of a 4-step random access channel is unavailable in an active bandwidth part for the first device, determine a duration for monitoring a contention resolution message based on one of: a first configuration of a 2-step random access channel in the active bandwidth part, or a second configuration of a 4-step random access channel in a bandwidth part different from the active bandwidth part.

In a second aspect, there is provided a second device. The second device comprises at least one processor and at least one memory storing computer program codes. The at least one memory and the computer program codes are configured, with the at least one processor, to cause the second device to transmit, to a first device, an indication to perform Msg3 transmission. The at least one memory and the computer program codes are also configured, with the at least one processor, to cause the second device to, in case a configuration of a 4-step random access channel is unavailable in an active bandwidth part for the first device, determine a duration for transmitting a contention resolution message to the first device based on one of: a first configuration of a 2-step random access channel in the active bandwidth part, or a second configuration of a 4-step random access channel in a bandwidth part different from the active bandwidth part. The at least one memory and the computer program codes are further configured, with the at least one processor, to cause the second device to in accordance with a determination that information of the first device for contention resolution is received from the first device, transmit the contention resolution message to the first device within the duration.

In a third aspect, there is provided a method. The method comprises receiving, at a first device from a second device, an indication to perform Msg3 transmission. The method also comprises transmitting, to the second device, information of the first device for contention resolution. The method further comprises in case a configuration of a 4-step random access channel is unavailable in an active bandwidth part for the first device, determining a duration for monitoring a contention resolution message based on one of: a first configuration of a 2-step random access channel in the active bandwidth part, or a second configuration of a 4-step random access channel in a bandwidth part different from the active bandwidth part.

In a fourth aspect, there is provided a method. The method comprises transmitting, at a second device to a first device, an indication to perform Msg3 transmission. The method also comprises in case a configuration of a 4-step random access channel is unavailable in an active bandwidth part for the first device, determining a duration for transmitting a contention resolution message to the first device based on one of: a first configuration of a 2-step random access channel in the active bandwidth part, or a second configuration of a 4-step random access channel in a bandwidth part different from the active bandwidth part. The method further comprises in accordance with a determination that information of the first device for contention resolution is received from the first device, transmitting the contention resolution message to the first device within the duration.

In a fifth aspect, there is provided an apparatus. The apparatus comprises means for receiving, at a first device from a second device, an indication to perform Msg3 transmission. The apparatus also comprises means for transmitting, to the second device, information of the first device for contention resolution. The apparatus further comprises means for in case a configuration of a 4-step random access channel is unavailable in an active bandwidth part for the first device, determining a duration for monitoring a contention resolution message based on one of: a first configuration of a 2-step random access channel in the active bandwidth part, or a second configuration of a 4-step random access channel in a bandwidth part different from the active bandwidth part.

In an sixth aspect, there is provided an apparatus. The apparatus comprises means for transmitting, at a second device to a first device, an indication to perform Msg3 transmission. The apparatus also comprises means for in case a configuration of a 4-step random access channel is unavailable in an active bandwidth part for the first device, determining a duration for transmitting a contention resolution message to the first device based on one of: a first configuration of a 2-step random access channel in the active bandwidth part, or a second configuration of a 4-step random access channel in a bandwidth part different from the active bandwidth part. The apparatus further comprises means for in accordance with a determination that information of the first device for contention resolution is received from the first device, transmitting the contention resolution message to the first device within the duration.

In a seventh aspect, there is provided a non-transitory computer readable medium storing program instructions for causing an apparatus to perform at least the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
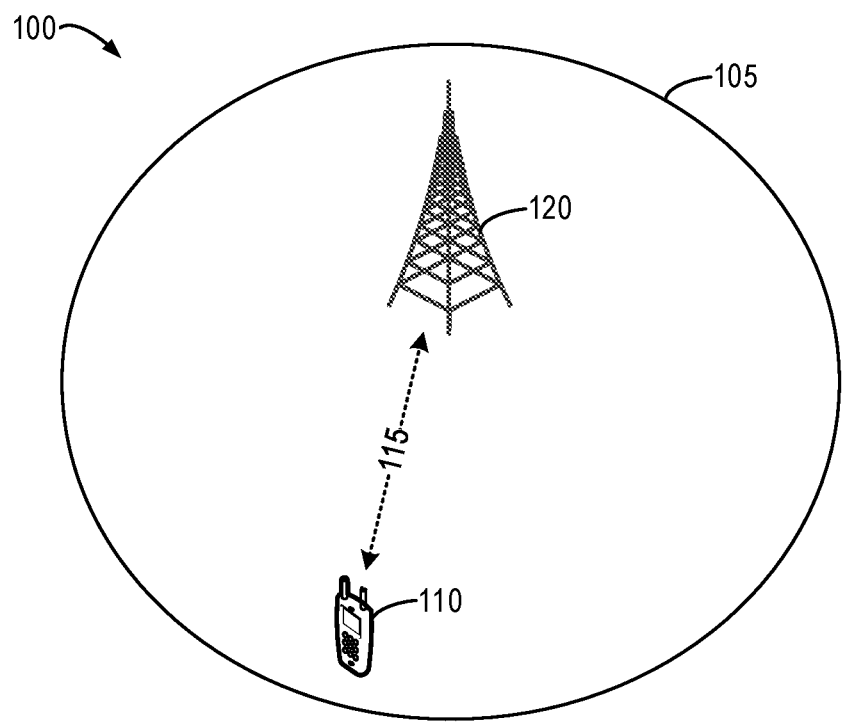
FIG. 1 illustrates a schematic diagram of a communication environment in which
some example embodiments of the present disclosure can be implemented.

Principles of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every example embodiment includes the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" or the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, components and/or the like, but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), a radio access network (RAN) node, an evolved NodeB (eNodeB or eNB), a NR NB (also referred to as a gNB), a Remote Radio Unit (RRU), a radio header (RH), an infrastructure device for a V2X (vehicle-to-everything) communication, a Transmission/Reception Point (TRP), a Reception Point (RP), a remote radio head (RRH), a relay, an Integrated Access and Backhaul (IAB) node, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), an unmanned aerial vehicle (UAV), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device," "communication device," "terminal," "user equipment" and "UE" may be used interchangeably.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

As mentioned, two types of random access procedure are supported: 4-step RA type and 2-step RA type. The first message in the 4-step RA type may be Msg1 and first message in the 2-step RA type may be MSGA. There may be two possible cases where a UE needs to receive contention resolution with Msg4 when performing a 2-step RA procedure. The first case may be when the network receives only a random access preamble of a MSGA in the 2-step RA procedure, but does not correctly decode the physical uplink shared channel (PUSCH) payload of the MSGA, it may send a fallbackRAR to the UE to perform Msg3 transmission for the PUSCH payload of the MSGA and contention resolution with Msg4 for the UE may follow. The second case may be that after a predefined or configured number N of MSGA attempts over 2-step RACH without receiving a response from the network, the UE can switch to using a 4-step RA procedure over 4-step RACH, start with preamble transmission, then random access response (RAR) reception, then Msg3 transmission, and contention resolution reception with Msg4.

In RAN2 #107bis, it was agreed to not allow switching to 4-step RACH when only 2-step RACH is configured to a bandwidth part (BWP) (for instance, uplink BWP) by not configuring 4-step RA resources or 4-step RACH in that BWP or by not configuring the number of N. In particular, a configuration where a switching from 2-step RA to 4-step RA is not allowed can be supported. The 2-step RACH resources can be configured on a BWP where 4-step RACH resources are not configured. In that case, switching to 4-step RA after N MSGA attempts may not be supported.

However, after receiving a fallbackRAR in a MSGB after MSGA transmission, a UE may need to continue with Msg3 transmission and perform contention resolution. How to determine the contention resolution window (or timer) to use after a fallback from 2-step RACH to Msg3 transmission or after switching from 2-step RACH to 4-step RACH is still not clear and indefinite, and thus needs to be studied and clarified.

For example, in one scenario, when a 4-step RACH configuration is not available for an active BWP of a UE where the RA procedure is performed, the UE behavior is unclear related to the timer for handling when the contention resolution is performed. One option would be to disallow using the fallbackRAR from the network in case 2-step RACH only BWP exists and the UE would always go back to MSGA reattempt even if preamble is correctly received. However, this will make the usage of such BWP for random access impractical, since there is much higher probability for the network being able to decode the preamble than the PUSCH part of a MSGA. Hence, the fallback as part of the 2-step RA procedure may need to be allowed in all BWPs even if the BWPs are configured only with 2-step RACH.

In view of the above problems and other potential problems in the traditional solutions, example embodiments of the present disclosure provide a solution for determining a contention resolution timer. In particular, in example embodiments of the present disclosure, duration for a terminal device to monitor a contention resolution message (or Msg4) transmitted by a network device in response to a Msg3 can be determined based on one or more of several factors in various scenarios including, for example, a fallback from the 2-step RA procedure to the Msg3 transmission, and a switching from the 2-step RA procedure to the 4-step RA procedure.

A plurality of advantages can be achieved through example embodiments of the present disclosure. For example, a fallback from the 2-step RA via a fallbackRAR is currently broken if the 4-step RA is not configured for the active BWP. Example embodiments can enable the fallback to Msg3 transmission and Msg4 reception, even if the 4-step RACH is not configured within the given BWP. In addition, example embodiments can also allow the network to prioritize, in the 4-step RACH, the UEs that have failed a plurality of times through the 2-step RACH. In general, example embodiments of the present disclosure can improve the performance of a random access procedure. Principles and implementations of example embodiments of the present disclosure will be described in detail below with reference to the figures.

FIG. 1 illustrates a schematic diagram of a communication environment 100 in which some example embodiments of the present disclosure can be implemented. As shown in FIG. 1, the communication environment (also referred to as a communication network) 100 includes a first device 110 and a second device 120 which can communicate with each other via a communication link 115.

In general, the first device 110 and the second device 120 can be any two suitable devices that can perform communications between them. In some example embodiments, the first device 110 may be a terminal device, and the second device 120 may be a network device. For example, the second device 120 can be a serving device of the first device 110 located in a cell 105 of the second device 120. For transmissions from the second device 120 to the first device 110, the communication link 115 may be referred to as a downlink channel, whereas for transmissions from the first device 110 to the second device 120, the communication link 115 may alternatively be referred to as an uplink channel.

In order to communicate with the second device 120 and the communication network 100, the first device 110 may need to first perform a random access procedure to obtain access to the second device 120 and the communication network 100. Two types of random access procedure are supported: 4-step RA type and 2-step RA type. Both types of RA procedure support contention-based random access (CBRA) and contention-free random access (CFRA). The first device 110 can select the type of random access at initiation of the random access procedure based on network configuration.

In the CBRA with 4-step RA type performed on a 4-step random access channel, the first device 110 can first transmit a random access preamble (also referred to as a Msg1) to the second device 120. Then, the second device 120 can transmit a random access response (also referred to as a Msg2) to the first device 110. Based on the received random access response, the first device 110 may transmit a first scheduled transmission (also referred to as a Msg3) to the second device 120, which may include information of the first device 110 for contention resolution, also termed as a PUSCH payload or payload for short. In response to the scheduled transmission from the first device 110, the second device 120 can transmit a contention resolution message (also referred to as Msg4) to the first device 110. The contention resolution message can indicate whether the contention resolution is successful for the first device 110.

In some examples, the contention resolution may be considered as successful based on a contention resolution message if notification of a reception of a PDCCH transmission of the Special Cell (SpCell) is received from lower layers and if the Cell-Radio Network Temporary Identifier (C-RNTI) medium access control (MAC) control element (CE) was included in Msg3 and if the Random Access procedure was initiated for beam failure recovery (as specified in clause 5.17) and the PDCCH transmission is addressed to the C-RNTI.

In some examples, the contention resolution may be considered as successful based on a contention resolution message if notification of a reception of a PDCCH transmission of the SpCell is received from lower layers and if the C-RNTI MAC CE was included in Msg3 and if the Random Access procedure was initiated by a PDCCH order and the PDCCH transmission is addressed to the C-RNTI.

In some examples, the contention resolution may be considered as successful based on a contention resolution message if notification of a reception of a PDCCH transmission of the SpCell is received from lower layers and if the C-RNTI MAC CE was included in Msg3 and if the Random Access procedure was initiated by the MAC sublayer itself or by the RRC sublayer and the PDCCH transmission is addressed to the C-RNTI and contains a UL grant for a new transmission.

In some examples, the contention resolution may be considered as successful based on a contention resolution message if the common control channel (CCCH) service data unit (SDU) was included in Msg3 and the PDCCH transmission is addressed to its TEMPORARY_C-RNTI and if the MAC PDU is successfully decoded and if the MAC PDU contains a UE Contention Resolution Identity MAC CE and if the UE Contention Resolution Identity in the MAC CE matches the CCCH SDU transmitted in Msg3.

Otherwise, contention resolution may be considered as unsuccessful, for instance, when parts of the above conditions are fulfilled but not all.

In the CBRA with 2-step RA type performed on a 2-step random access channel, the first device 110 can first transmit a MSGA to the second device 110, which MSGA may include random access preamble and payload (also referred to as PUSCH payload) transmissions of the random access procedure for 2-step RA type. In other words, the MSGA in the CBRA with 2-step RA type can include both the contents of the Msg1 and Msg3 in the CBRA with 4-step RA type. In response to the MSGA, the second device 120 can transmit a MSGB to the first device 110. For example, the MSGB may consist of response(s) for contention resolution, fallback indication(s), and backoff indication.

In the random access procedure of the 2-step RA type, after MSGA transmission, the first device 110 can monitor for a response (namely, the MSGB) from the second device 120 within a configured time window, for instance, a MSGB reception window. In particular, for CBRA, if contention resolution is successful upon receiving the network response, the first device 110 can end the random access procedure; while if an fallback indication is received in the MSGB (for example, in case that the second device 120 successfully receives the random access preamble in the MSGA, but unsuccessfully receives the PUSCH payload in the MSGA), first device 110 can perform Msg3 transmission and monitors a contention resolution message (a Msg4) from the second device 120. If contention resolution is not successful after Msg3 (re)transmission(s), first device 110 may go back to MSGA transmission, for example, if the contention resolution timer (or window) expires. In addition, if the 2-step random access procedure is not completed after a predefined or configured number of MSGA transmissions, first device 110 can be configured to switch to the 4-step CBRA procedure.

In some scenarios, the first device 110 may be configured, for example by the second device 120, with a number of bandwidth parts, which may have different bandwidths and configurations. For example, the bandwidth parts may be uplink bandwidth parts. For example, the configurations of the 2-step random access channel and the 4-step random access channel may be different in different bandwidth parts of the first device 110. In addition, one of the 2-step random access channel and the 4-step random access channel may be unavailable for one or more bandwidth parts of the first device 110. For instance, the 4-step random access channel may be unavailable in an active bandwidth part for the first device 110, which is the bandwidth part in which the first device 110 is currently operating, for example, the active bandwidth part.

In addition to the active bandwidth part, the first device 110 may be configured with other bandwidth parts for various functions. For example, the first device 110 may have an initial bandwidth part, in which the 4-step random access channel is available for the first device 110 to obtain access to network through the random access procedure. More specifically, a UE configured for operation in bandwidth parts (BWPs) of a serving cell, is configured by higher layers for the serving cell a set of bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

As another example, the first device 110 may have a first active bandwidth part for the handover scenario, in which the first device 110 can first operate after a handover. More specifically, the UE can be provided by firstActiveDownlinkBWP-Id a first active DL BWP for receptions and by firstActiveUplinkBWP-Id a first active UL BWP for transmissions on a carrier of a serving cell, for example, primary cell or primary secondary cell or secondary cell. If a UE is provided by firstActiveDownlinkBWP-Id a first active DL BWP and by firstActiveUplinkBWP-Id a first active UL BWP on a carrier of a secondary cell, the UE uses the indicated DL BWP and the indicated UL BWP as the respective first active DL BWP on the secondary cell and first active UL BWP on the carrier of the secondary cell when it is activated from deactivated state or upon configuration.

As a further example, the first device 110 may have a default bandwidth part for saving power, where default bandwidth part may be relatively narrower than other bandwidth parts. More specifically, for a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

Although the first device 110 and the second device 120 are described in the communication environment 100 of FIG. 1, example embodiments of the present disclosure may be equally applicable to any other suitable communication devices in communication with one another. That is, example embodiments of the present disclosure are not limited to the example scenario of FIG. 1. In this regard, it is noted that although the first device 110 and the second device 120 are schematically depicted as a mobile phone and a base station in FIG. 1, it is understood that this depiction is only for example without suggesting any limitation. In other example embodiments, the first device 110 and the second device 120 may be any other communication devices, for example, wireless communication devices.

It is to be understood that the number of communication devices, the number of communication links, and the number of other elements as shown in FIG. 1 are only for the purpose of illustration without suggesting any limitations. The communication environment 100 may include any suitable number of communication devices, any suitable number of communication links, and any suitable number of other elements adapted for implementing example embodiments of the present disclosure. In addition, it would be appreciated that there may be various wireless communications as well as wireline communications (if needed) among all the communication devices.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
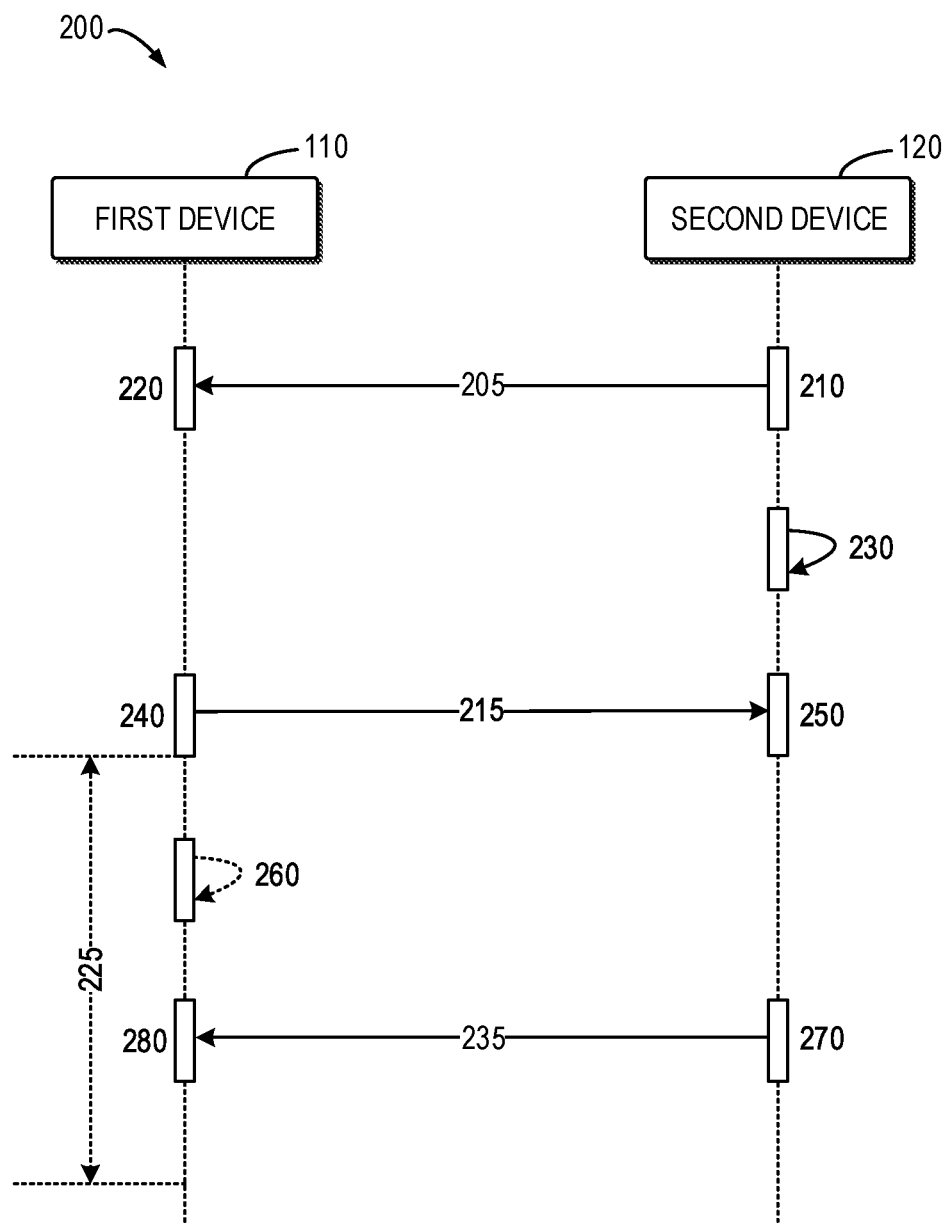
FIG. 2 illustrates an example communication process between a first device and a second device in accordance with some example embodiments of the present disclosure.

Reference is now made to FIG. 2, which illustrates an example communication process 200 between the first device 110 and the second device 120 in accordance with some example embodiments of the present disclosure. For the purpose of discussion, the communication process 200 will be described with reference to FIG. 1. However, it would be appreciated that the communication process 200 may be equally applicable to other communication scenarios where two devices communicate with each other.

As shown in FIG. 2, the second device 120 transmits 210 an indication 205 to the first device 110, and the indication 205 may cause the first device 110 to perform Msg3 transmission. For example, before the second device 120 transmits 210 the indication 205, the first device 110 may have transmitted a MSGA to the second device 120 to initiate a 2-step random access procedure. However, the second device 120 may have successfully received the random access preamble in the MSGA, but have failed to receive the PUSCH payload in the MSGA.

In such an event, the second device 120 may then inform the first device 110 to transmit a Msg3 as a retransmission of the PUSCH payload of the MSGA (or generally the MAC PDU stored in the MSGA buffer), and the indication 205 can be a fallbackRAR in a MSGB in response to MSGA transmission. It should be understood that example embodiments of the present disclosure are not limited to this specific scenario, but are equally applicable to any other scenarios in which the second device 120 transmit an indication to the first device 110 to perform Msg3 transmission.

After receiving 220 the indication 205 from the second device 120, the first device 110 transmits 240 information 215 of the first device 110 for contention resolution to the second device 120, and the second device 120 receives 250 the same from the first device 110. In some example embodiments, the information 215 may include C-RNTI MAC CE or CCCH SDU, submitted from upper layer and associated with the UE Contention Resolution Identity, as part of a Random Access procedure. More generally, the information 215 may include any information of the first device 110 that can be used for contention resolution in a random access procedure. In some example embodiments, the information 215 may be transmitted 240 via a Msg3 of a random access procedure and the second device 120 may thus receive 250 the information 215 via the Msg3. In the following, the information 215 may also be referred to as the Msg3 215 for ease of discussion. However, it is to be understood that the first device 110 can alternatively transmit 240 the information 215 via any other existing or future messages.

As mentioned above, subsequent to transmitting 240 the Msg3 215, the first device 110 may expect a contention resolution message (also referred to as Msg4) 235 from the second device 120. In particular, the first device 110 can monitor the contention resolution message or potential retransmission grant for Msg3 re-transmission 235 from the second device 120 for duration 225, which may be determined in a same way at both sides of the first device 110 and the second device 120. If the Msg3 is not correctly decoded by the second device 120, it may schedule retransmission within the contention resolution timer. The first device 220 restarts the timer upon retransmission of Msg3.

If the contention resolution message 235 is received within the duration 225, then the first device 110 may determine whether the contention resolution is successful for itself based on the content of the contention resolution message 235. If the contention resolution is successful, the first device 110 can end the random access procedure. Otherwise, if the contention resolution message 235 is not received within the duration 225 but Msg3 retransmission grant is received, the first device 110 may retransmit the Msg3 215 based on the scheduled retransmission grant. If the first device 110 still fails to receive the contention resolution message and Msg3 retransmission grant 235 within the duration 225, the first device 110 can start another attempt of the random access procedure. Similarly, if the content of the contention resolution message 235 indicates that the contention resolution is unsuccessful for the first device 110, the first device 110 can also start another attempt of the random access procedure, with either MSGA or Msg1 transmission depending on whether it has performed maximum number of MSGA re-attempts.

Therefore, in order to allow the first device 110 to complete the random access procedure, the second device 120 may need to know the duration 225 for the first device 110 to monitor the contention resolution message or Msg3 retransmission grant 235, and may need to transmit 270 the contention resolution message or Msg3 retransmission grant 235 to the first device 110 within the duration 225. Accordingly, before transmitting 270 the contention resolution message or Msg3 retransmission grant 235 to the first device 110, the second device 120 can determine 230 the duration 225 during which the first device 110 monitors the contention resolution message or Msg3 retransmission grant 235. In other words, the second device 120 determines 230 the duration 225 for transmitting the contention resolution message or Msg3 retransmission grant 235 to the first device 110. Although the determining operation 230 is depicted after the transmitting operation 210 and before the receiving operation 250, it should be noted that the second device 120 can determine the duration 225 at any suitable time point prior to the transmission of the contention resolution message or Msg3 retransmission grant 235. Similarly, the first device 110 needs to determine the duration 225.

With different configurations of the 2-step random access channel and the 4-step random access channel, the first device 110 and/or the second device 120 may determine 230 the duration 225 in different ways. For example, it may be assumed that the first device 110 is operating in its active bandwidth part, and the 4-step random access channel is available in the active bandwidth part. Then, the configuration of the 4-step random access channel for the active bandwidth part may indicate a contention resolution timer, which may be used by the first device 110 for monitoring a Msg4 in a 4-step random access procedure. In this event, the first device 110 can determine the duration 225 as the time length of the contention resolution timer as indicated in the configuration of the 4-step random access channel. Accordingly, if the 4-step random access channel is available in a bandwidth part for the first device 110, the network (for example, the second device 120) may not need to configure a contention resolution timer in the configuration of the 2-step random access channel in the bandwidth part.

However, as discussed above, the 4-step random access channel may sometimes be unavailable in the active bandwidth part for the first device 110. In other words, there is not a configured contention resolution timer for the active bandwidth part that can be used by the first device 110 to monitor the contention resolution message 235. In this event, as an explicit rule for determining the duration 225, the first device 110 and/or the second device 120 may determine 230 the duration 225 based on a configuration of the 2-step random access channel in the active bandwidth part, which configuration may also be referred to as a first configuration hereinafter. More specifically, if the 4-step random access channel is unavailable for the active bandwidth part and the first configuration indicates a contention resolution timer, the first device 110 and/or the second device 120 can determine 230 the duration 225 as the time length of the contention resolution timer as indicated in the first configuration. With such an explicit rule, the efficiency of the determination of the duration 225 by the first device 110 (and also the second device 120) can be improved.

Alternatively, as an implicit rule for determining the duration 225, the first device 110 and/or the second device 120 may determine 230 the duration 225 based on a configuration of a 4-step random access channel in a bandwidth part different from the active bandwidth part, which configuration may also be referred to as a second configuration hereinafter. In other words, although the 4-step random access channel is unavailable for the active bandwidth part, it may be available in other bandwidth parts of the first device 110. Thus, in case the 4-step random access channel is unavailable for the active bandwidth part, the first device 110 and/or the second device 120 can determine 230 the duration 225 as the time length of a contention resolution timer indicated in the second configuration of the 4-step random access channel in another bandwidth part. With such an implicit rule, there is no need to use extra signaling for indicating the duration 225, and thus the signaling overhead can be reduced. In some example embodiments, the implicit rule may be applied only if the explicit rule is not applied. In other words, if the first configuration does not indicate a contention resolution timer, then the second device 120 can determine 230 the duration 225 based on the second configuration.

As some examples, the above bandwidth part different from the active bandwidth part may be an initial bandwidth part, a default bandwidth part, a first active bandwidth part, or other defined bandwidth parts of the first device 110. For example, the 4-step random access channel may be always available in an initial bandwidth part for the first device 110, and thus the contention resolution timer advertised in the system information block (SIB) for the initial UL BWP or configured by dedicated radio resource control (RRC) signaling for the UE for the initial UL BWP may be used for contention resolution reception by the first device 110. Further, which one of the various bandwidth parts is to be used for the above purpose may be configurable by the network, for example, the second device 120.

In this way, the contention resolution timer as indicated in the configuration of the 4-step random access channel in an already defined bandwidth part for the first device 110 can be used for the active bandwidth part without a configuration of the 4-step random access channel, and thus the signaling overhead for indicating a particular bandwidth part for such a function can be saved.

Alternatively, the above bandwidth part different from the active bandwidth part may be a predetermined bandwidth part indicated by the second device 120. In other words, the second device 120 can indicate a specific bandwidth part, and the contention resolution timer as indicated in the configuration of the 4-step random access channel in this indicated bandwidth part can be used by the first device 110 and/or the second device 120 (also the first device 110) to determine the duration 225. In this way, the flexibility of selection of the bandwidth part whose configuration of the 4-step random access channel is to be used for the active bandwidth part can be improved.

In some example embodiments, as another implicit rule for determining the duration 225, the first device 110 and/or the second device 120 may determine 230 the duration 225 based on a time length during which the first device 110 monitors a MSGB from the second device 120. The MSGB monitored by the first device 110 is transmitted by the second device 120 in response to a MSGA transmitted by the first device 110 over the 2-step random access channel. For example, such a timer length during which the first device 110 monitors a MSGB from the second device 120 may be referred to as MSGB response window or msgB-Response-Window. Such example embodiments will be described later in more details with reference to FIG. 3.

In some example embodiments, for determining the duration 225, the first device 110 and/or the second device 120 may determine 230 the duration 225 based on a partial configuration of a 4-step random access channel in the active bandwidth part, which configuration may also be referred to as a second configuration hereinafter. In other words, although the 4-step random access channel is unavailable for the active bandwidth part, part of the configuration may be provided for the active bandwidth part as well, for instance, the part of the configuration consisting of the contention resolution timer configuration. In some embodiments, any other parameters (in addition to the contention resolution timer configuration) of the 4-step random access channel configuration may be ignored by the first device 110.

The above discussions are based on the assumption that the 4-step random access channel is unavailable in the active bandwidth part for the first device 110. However, as an example embodiment of the explicit rule for determining the duration 225, the first configuration of the 2-step random access channel in the active bandwidth part may always indicate a contention resolution timer, regardless of whether the 4-step random access channel is unavailable in the active bandwidth part. In another example embodiment, the first configuration of 2-step random access channel with contention resolution timer in the active bandwidth part may be only present or configured by the second device 120 if the 4-step random access channel is not configured or is unavailable in the active bandwidth part as explained above.

In other words, there is a possibility that both the configuration of the 2-step random access channel and the configuration of the 4-step random access channel are present for the active bandwidth part, and the two configurations indicate two contention resolution timers with different time lengths. For ease of discussion, the contention resolution timer indicated in the configuration of the 2-step random access channel may be referred to as a first contention resolution timer, and the contention resolution timer indicated in the configuration of the 4-step random access channel may be referred to as a second contention resolution timer.

In the case that both the first and second contention resolution timers are present in the active bandwidth part for the first device 110, the second device 120 (also the first device 110) may always determine the duration 225 as the time length of the first contention resolution timer, since it is indicated for the 2-step random access procedure as currently being performed by the first device 110. However, for the scenario in which the first device 110 switches from a 2-step random access procedure to a 4-step random access procedure after a predefined or configured number of unsuccessful random access attempts, there are two options for selecting the contention resolution timer to be used by the first device 110 in the 4-step random access procedure.

As the first option, the first contention resolution timer may be selected as the contention resolution timer to be used in the 4-step random access procedure. If the first contention resolution timer has a shorter time length than the second contention resolution timer, this allows the network (for example, the second device 120) to prioritize, in the 4-step RACH, UEs whose random access procedures lasted already over a number of MSGA attempts through the 2-step RACH.

Alternatively, as the second option, the second contention resolution timer may be selected as the contention resolution timer to be used in the 4-step random access procedure. This may be a more intuitive option, since a 4-step random access procedure is currently performed by the first device 110 anyway. On the other hand, if the 4-step random access channel is not configured, namely, there is only the first contention resolution timer but no second contention resolution timer, then the first contention resolution timer may be used for a fallback case and the first device 110 cannot switch to a 4-step random access procedure after a number of MSGA attempts in a 2-step random access procedure.

Continuing with reference to FIG. 2, after transmitting 240 the Msg3 215 to the second device 120, the first device 110 may determine 260 the duration 225 in a same way as that used by the second device 120 for determining 230 the duration 225, so that the first device 110 and the second device 120 can obtain identical duration 225. For example, if the configuration of the 4-step random access channel is unavailable in the active bandwidth part for the first device 110, the first device 110 can determine 260 the duration 225 based on the first configuration of the 2-step random access channel in the active bandwidth part, or the second configuration of the 4-step random access channel in a bandwidth part different from the active bandwidth part. Further details of the determining operation 260 may be understood with reference to the description of the determining operation 230, and thus will not be repeated herein. Although the determining operation 260 is depicted after the transmitting operation 240, it is appreciated that the first device 110 can determine the duration 225 at any suitable time point prior to receiving 280 the contention resolution message 235.

In general, the first configuration and the second configuration for determining the duration 225 can be obtained by the first device 110 and the second device 120 in any suitable manner. For example, the two configurations may be predefined or predetermined by the higher layer, so that there is no need to use extra signaling for indicating the first and second configurations. In some other example embodiments, the second device 120 can determine the first and second configurations for the first device 110, and then inform the first device 110 of the two configurations. In this way, the first and second configurations can be determined by the network in a flexible manner. Such example embodiments will be detailed later with reference to FIG. 4.

After determining 230 the duration 225 and receiving 250 the information 215 of the first device 110 for contention resolution from the first device 110, the second device 120 transmits 270 the contention resolution message or Msg3 re-transmission grant 235 to the first device 110 within the duration 225. For example, if the contention resolution is successful for the first device 110, the second device 120 can transmit the contention resolution message 235 indicating the success of the contention resolution for the first device 110. Otherwise, if the contention resolution is unsuccessful for the first device 110, the second device 120 can transmit the contention resolution message 235 indicating that the contention resolution is failed for the first device 110.

Similarly, after transmitting 240 the Msg3 215 to the second device 120 and determining 260 the duration 225, the first device 110 can monitor the contention resolution message 235 for the duration 225. For example, the first device 110 can start a contention resolution timer with the duration 225 for monitoring the contention resolution message 235. Upon receiving 280 the contention resolution message 235 from the second device 120 within the duration 225, the first device 110 can determine whether the contention resolution is successful for itself based on the content of the contention resolution message 235. If the contention resolution is successful for the first device 110, the random access procedure is complete. Otherwise, if the first device 110 fails to receive the contention resolution message 235 within the duration 225 after a number of transmissions of the Msg3 21, or receives the contention resolution message 235 indicating the contention resolution is unsuccessful for itself, the first device 110 can make another attempt to perform the random access procedure.

As described above, in some example embodiments, the first device 110 and/or the second device 120 may determine 230 the duration 225 based on a time length during which the first device 110 monitors a MSGB from the second device 120, for example MSGB response window. Such example embodiments will now be described with reference to FIG. 3, which illustrates another example communication process 300 between the first device 110 and the second device 120 in accordance with some example embodiments of the present disclosure. For the purpose of discussion, the communication process 300 will be described with reference to FIG. 1. However, it would be appreciated that the communication process 300 may be equally applicable to other communication scenarios where two devices communicate with each other.

Figure 3:
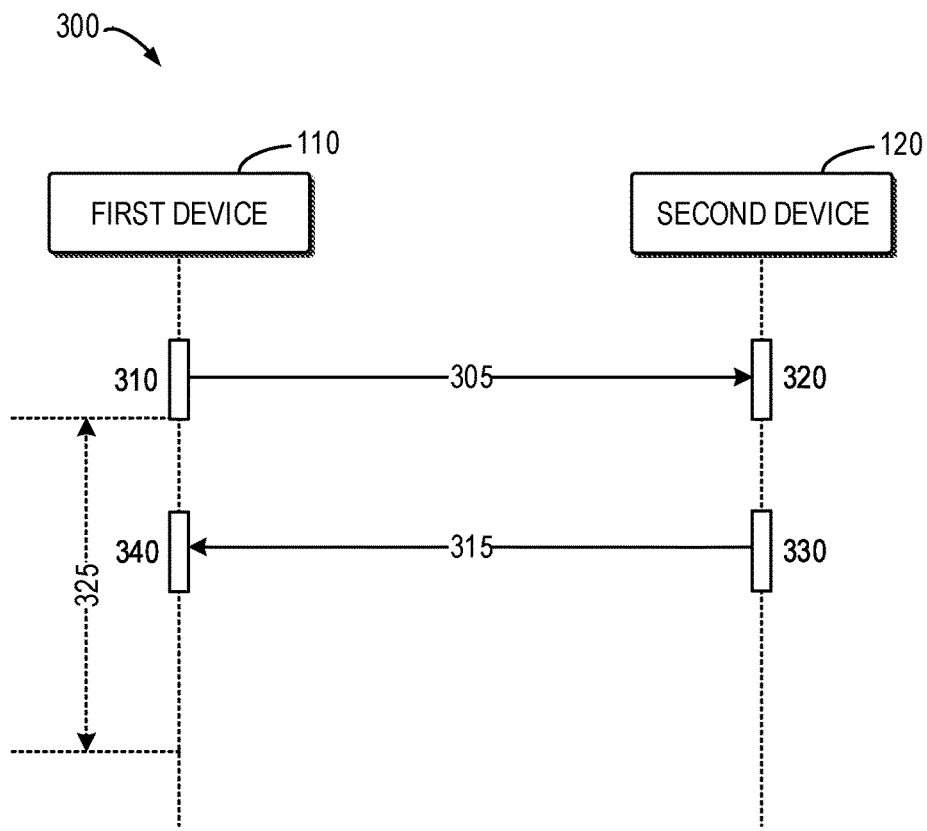
FIG. 3 illustrates another example communication process between a first device and a second device in accordance with some example embodiments of the present disclosure.

As shown in FIG. 3, in order to initiate a 2-step random access procedure, the first device 110 may transmit 310 a MSGA 305 to the second device 120, for example, on the 2-step random access channel. After transmitting 310 the MSGA 305, the first device 110 may expect a MSGB 315 to be transmitted 330 by the second device 120 in response to the MSGA 305. Therefore, the first device 110 can monitor the MSGB 315 for a time length 325, which may be indicated in the configuration of the 2-step random access channel for the active bandwidth part and may be referred to as an MSGB response window hereinafter. If the MSGB 315 is received 340 within the time length 325, the first device 110 can proceed to perform a next operation based on the content of the MSGB 315.

For example, if the second device 120 successfully receives 320 the random access preamble but not the payload in the MSGA 305, then the MSGB 315 transmitted 330 by the second device 120 may contain a fallback indication to indicate the first device 110 to perform Msg3 transmission. Upon receiving 340 the MSGB 315 containing the fallback indication, the first device may transmit a Msg3 to the second device 120, which Msg3 may be a retransmission of the payload in the MSGA 305. In this event, the MSGB 315 containing the fallback indication may be an embodiment of the indication 205 as shown in FIG. 2.

As another example, if the second device 120 successfully receives both the random access preamble and the payload in the MSGA 305, and the contention resolution is successful for the first device 110, then the MSGB 315 transmitted 330 by the second device 120 can include contention resolution information indicating the success of the contention resolution for the first device 110. Upon receiving 340 the MSGB 315 containing the contention resolution information, the first device 110 may determine that the contention resolution is successful for itself and the 2-step random access procedure is complete.

On the other hand, if the first device 110 fails to receive the MSGB 315 within the time length 325, the first device 110 can retransmit the MSGA 305 to the second device 120. If the first device 110 still fails to receive the MSGB 315 within the time length 325 after a predefined or configured number of (re) transmission of the MSGA 305, the first device 110 may switch to a 4-step random access procedure in case the 4-step random access channel is available. Otherwise, the first device 110 may determine that the random access procedure fails.

At the network side, after receiving 320 the MSGA 305 from the first device 110, the second device 120 can transmit 330 the MSGB 315 to the first device 110 within the time length 325, which time length 325 is also known by the second device 120. As discussed above, the content of the MSGB 315 may depend on whether the contention resolution is successful for the first device 110 and whether the content of the MSGA 305 is successfully received 320 by the second device 120.

Referring to both FIGS. 2 and 3, in the case that the MSGB 315 contains a fallback indication, the communication process 200 as shown in FIG. 2 may be performed between the first device 110 and the second device 120 subsequently. In some example embodiments, when determining 230 the duration 225, the first device 110 and/or the second device 120 can determine 230 the duration 225 as the time length 325 for the first device 110 monitoring the MSGB 315 from the second device 120. In other words, the first device 110 and/or the second device 120 can determine 230 the duration 225 as the time length 325 for the second device 120 to transmit the MSGB 315 to the first device 110. Analogously, when determining 260 the duration 225, the first device 110 can determine 260 the duration 225 as the time length 325 for monitoring the MSGB 315 from the second device 120.

In this way, the duration 225 and the time length 325 can be configured to be identical, and thus can be indicated using a common indication instead of separate indications, thereby reducing the signaling overhead. Alternatively, the duration 225 may be determined as the time length 325 regardless of whether the 4-step random access channel is configured for the active bandwidth part, since the MSGB response window is intended for monitoring a response to the PUSCH part of the MSGA, which is retransmitted in the Msg3 for the fallback case. Further, the network (for example, the second device 120) can configure which one of the MSGB response window and the contention resolution timer indicated in the configuration of the 4-step random access channel is to be applied to determine the duration 225 if both are configured.

As mentioned above in describing FIG. 2, in some example embodiments, the second device 120 can determine the first configuration and the second configuration for the determining the duration 225, and then inform the first device 110 of the first configuration and the second configuration. In this way, the first configuration and the second configuration can be determined by the network in a flexible manner. Such example embodiments will now be detailed with reference to FIG. 4.

Figure 4:
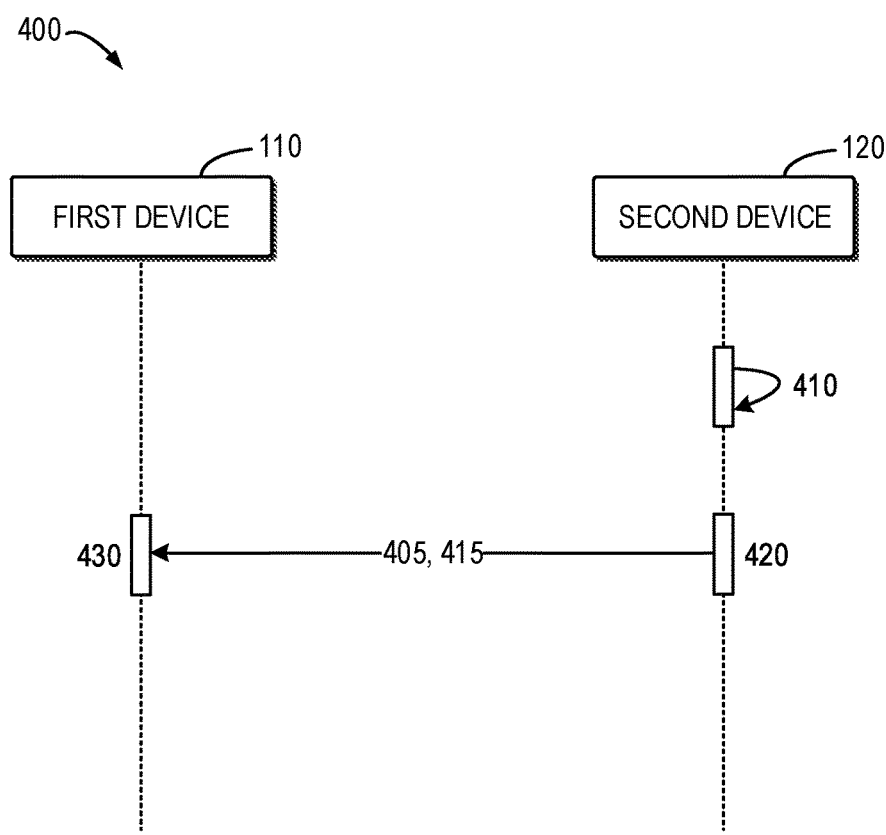
FIG. 4 illustrates a further example communication process between a first device and a second device in accordance with some example embodiments of the present disclosure.

FIG. 4 illustrates a further example communication process 400 between the first device 110 and the second device 120 in accordance with some example embodiments of the present disclosure. For the purpose of discussion, the communication process 400 will be described with reference to FIG. 1. However, it would be appreciated that the communication process 400 may be equally applicable to other communication scenarios where two devices communicate with each other.

As shown in FIG. 4, the second device 120 may determine 410 the first configuration 405 and the second configuration 415 for the first device 110. In particular, the second device 120 can configure various parameters of the 2-step random access channel in the active bandwidth part for the first device 110, and also configure various parameters of the second configuration of the 4-step random access channel in the bandwidth part different from the active bandwidth part. In addition, the second device 120 can configure whether the 2-step random access channel or the 4-step random access channel is available for a bandwidth part for the first terminal device 110. For example, the second device 120 may configure the 4-step random access channel to be unavailable in a particular bandwidth part for the first device 110.

Without loss of generality, it is assumed that the particular bandwidth part is used by the first device 110 as the active bandwidth part. In this event, there is no available configuration of the 4-step random access channel for the first device 110 to perform a fallback from the 2-step random access procedure to Msg3 transmission. Accordingly, the second device 120 can configure a contention resolution timer in the first configuration 405 of the 2-step random access channel in the particular bandwidth part. In other words, if the configuration of the 4-step random access channel is unavailable in a bandwidth part, the second device 120 can determine 410 the first configuration 405 to indicate a contention resolution timer for the bandwidth part. In this way, an explicit indication of the contention solution timer is provided to the first device 110 to enable a fallback from the 2-step random access procedure to Msg3 transmission.

On the other hand, if the 4-step random access channel is available in a bandwidth part for the first device 110, the second device 120 may not indicate a contention resolution timer in the first configuration 405 of the 2-step random access channel in the bandwidth part. In other words, if the configuration of the 4-step random access channel is available in a bandwidth part, the second device 120 may determine 410 the first configuration 405 to not indicate a contention resolution timer for the bandwidth part. In this way, the signaling overhead for indicating the contention resolution timer can be saved.

Alternatively, the second device 120 may determine the first configuration 405 to indicate a contention resolution timer for a bandwidth part, regardless of whether the 4-step random access channel is available in the bandwidth part. In other words, the second device 120 can always configure a contention resolution timer in the first configuration 405 of the 2-step random access channel in a bandwidth part for the first device 110, no matter whether the 4-step random access channel is available in the bandwidth part or not. In this way, the operation of the second device 120 for configuring the contention resolution timer in the first configuration 405 can be simplified, because the second device 120 does not to determine whether the 4-step random access channel is available before configure the contention resolution timer in the first configuration 405.

After determining 410 the first configuration 405 and the second configuration 415, the second device 120 may transmit 420 them to the first device 110. For example, the first configuration 405 and the second configuration 415 may be transmitted 420 via one message, such as a RRC message. Alternatively, the first configuration 405 and the second configuration 415 can be transmitted 420 in separate messages, such as two RRC messages. In addition, referring both FIGS. 2 and 4, the first device 110 and/or the second device 120 can determine 230 the duration 225 based on the first configuration 405 and the second configuration 415. In a similar way, after receiving 430 the first configuration 405 and the second configuration 415 from the second device 120, the first device 110 may determine 260 the duration 225 based on the first configuration 405 and the second configuration 415.

Figure 5:
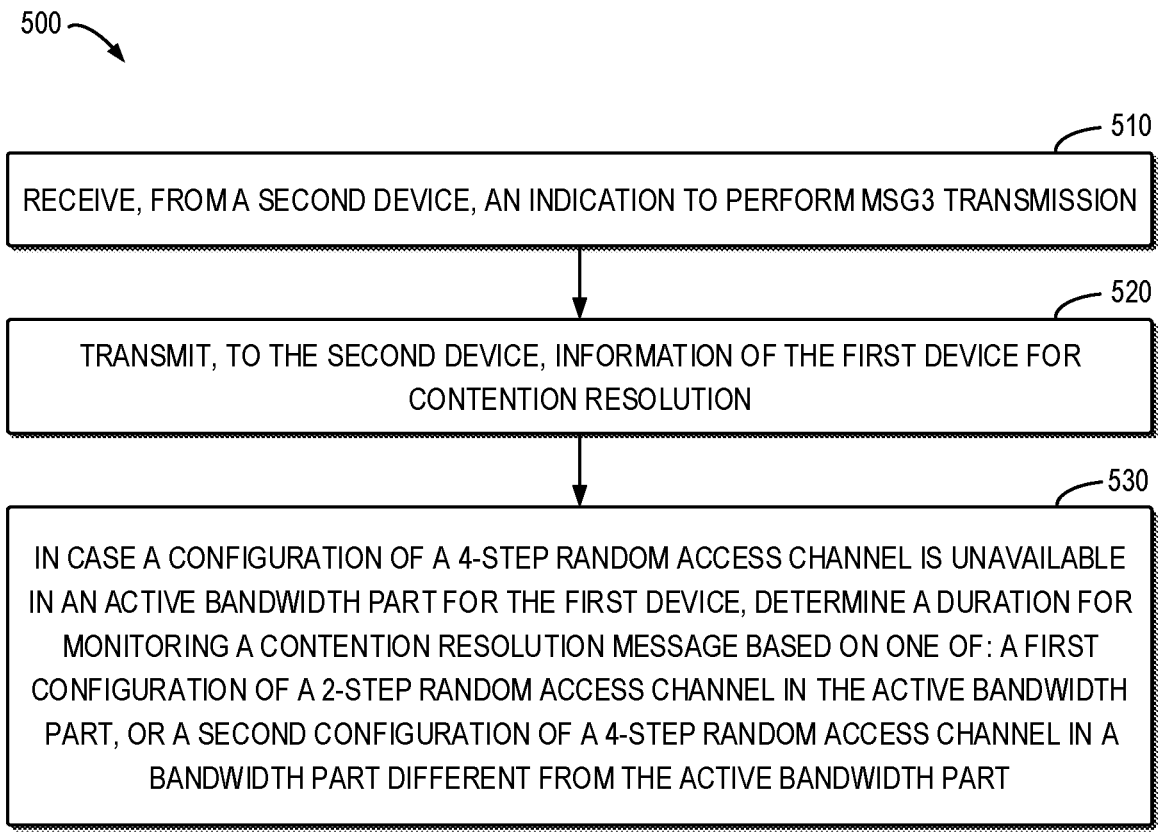
FIG. 5 illustrates a flowchart of an example method in accordance with some example embodiments of the present disclosure.

FIG. 5 illustrates a flowchart of an example method 500 in accordance with some example embodiments of the present disclosure. In some example embodiments, the method 500 can be implemented at a device in a communication network, such as the first device 110 as shown in FIG. 1. Additionally or alternatively, the method 500 can also be implemented at other devices shown in FIG. 1. In some other example embodiments, the method 500 may be implemented at devices not shown in FIG. 1.

At block 510, the first device 110 receives, from the second device 120, an indication to perform Msg3 transmission. At block 520, the first device 110 transmits, to the second device 120, information of the first device for contention resolution. At block 530, in case a configuration of a 4-step random access channel is unavailable in an active bandwidth part for the first device 110, the first device 110 determines a duration for monitoring a contention resolution message based on one of: a first configuration of a 2-step random access channel in the active bandwidth part, or a second configuration of a 4-step random access channel in a bandwidth part different from the active bandwidth part.

In some example embodiments, determining the duration comprises: in accordance with a determination that the first configuration indicates a contention resolution timer, determining the duration as a time length of the contention resolution timer.

In some example embodiments, determining the duration comprises: in case the first configuration does not indicate a contention resolution timer, determining the duration as a time length of a contention resolution timer indicated in the second configuration.

In some example embodiments, the bandwidth part comprises one of the following: an initial bandwidth part for the first device 110, a default bandwidth part for the first device 110, a first active bandwidth part for the first device 110, or a predetermined bandwidth part indicated by the second device 120.

In some example embodiments, the method 500 further comprises: in case the first configuration does not indicate a contention resolution timer, determining the duration as a time length for monitoring a MSGB from the second device 120, the MSGB being transmitted by the second device 120 in response to a MSGA transmitted over the 2-step random access channel.

In some example embodiments, the time length for monitoring the MSGB is a time length of an MSGB response window.

In some example embodiments, the information of the first device for contention resolution is transmitted via a Msg3 of a random access procedure.

In some example embodiments, the method 500 further comprises: receiving the first configuration and the second configuration from the second device 120.

In some example embodiments, the first device 110 comprises a terminal device, and the second device 120 comprises a network device.

Figure 6:
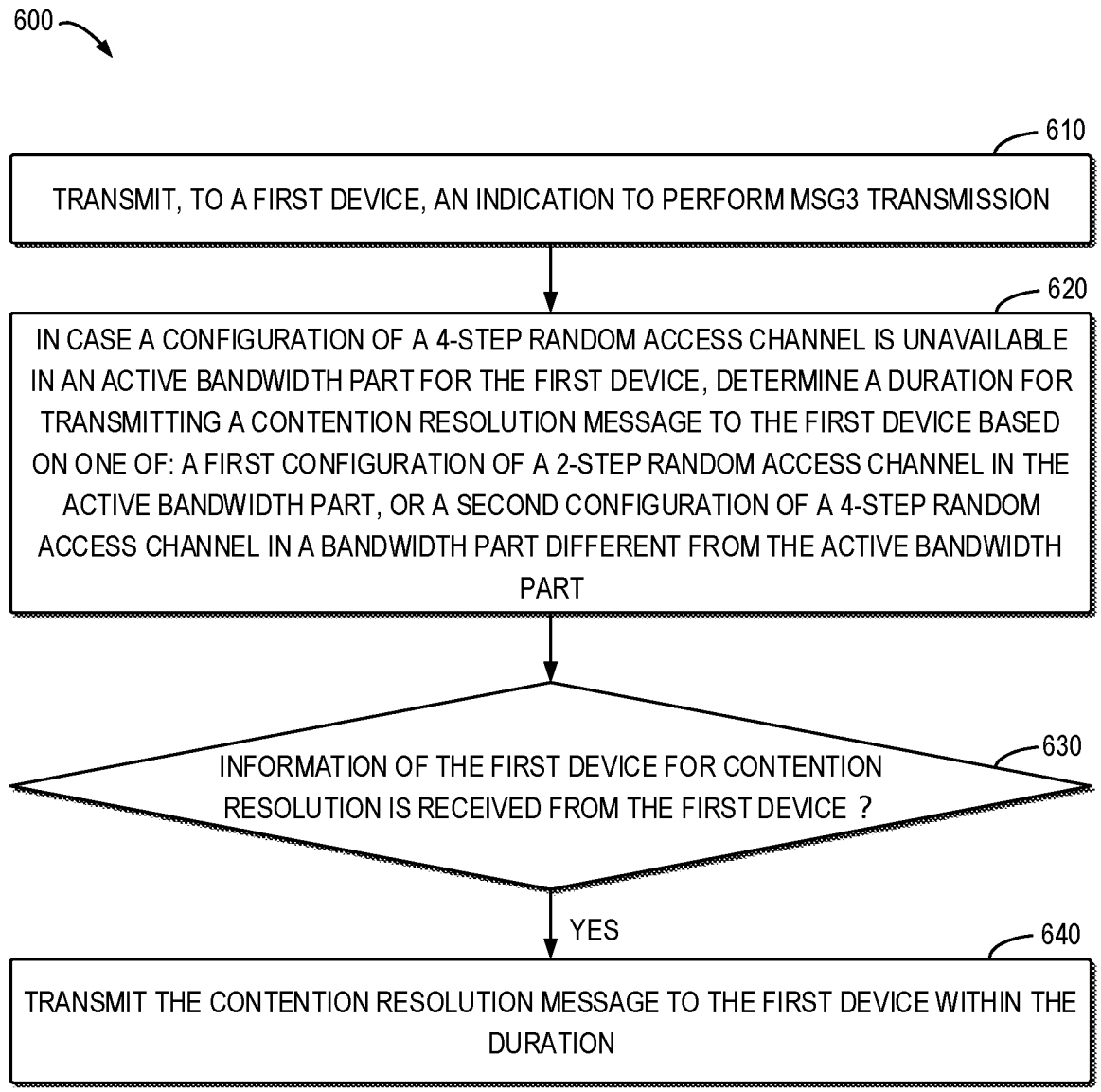
FIG. 6 illustrates a flowchart of another example method in accordance with some example embodiments of the present disclosure.

FIG. 6 illustrates a flowchart of another example method 600 in accordance with some example embodiments of the present disclosure. In some example embodiments, the method 600 can be implemented at a device in a communication network, such as the second device 120 as shown in FIG. 1. Additionally or alternatively, the method 600 can also be implemented at other devices shown in FIG. 1. In some other example embodiments, the method 600 may be implemented at devices not shown in FIG. 1.

At block 610, the second device 120 transmits, to the first device 110, an indication to perform Msg3 transmission. At block 620, in case a configuration of a 4-step random access channel is unavailable in an active bandwidth part for the first device 110, the second device 120 determines a duration for transmitting a contention resolution message to the first device 110 based on one of: a first configuration of a 2-step random access channel in the active bandwidth part, or a second configuration of a 4-step random access channel in a bandwidth part different from the active bandwidth part. At block 630, the second device 120 determines whether information of the first device for contention resolution is received from the first device 110. At block 640, in accordance with a determination that the information of the first device for contention resolution is received from the first device 110, the second device 120 transmits the contention resolution message to the first device 110 within the duration.

In some example embodiments, determining the duration comprises: in accordance with a determination that the first configuration indicates a contention resolution timer, determining the duration as a time length of the contention resolution timer.

In some example embodiments, determining the duration comprises: in case the first configuration does not indicate a contention resolution timer, determining the duration as a time length of a contention resolution timer indicated in the second configuration.

In some example embodiments, the bandwidth part comprises one of the following: an initial bandwidth part for the first device 110, a default bandwidth part for the first device 110, a first active bandwidth part for the first device 110, or a predetermined bandwidth part indicated by the second device 120.

In some example embodiments, the method 600 further comprises: in case the first configuration does not indicate a contention resolution timer, determining the duration as a time length for the first device 110 to monitor a MSGB from the second device 120, the MSGB being transmitted by the second device 120 in response to a MSGA transmitted over the 2-step random access channel.

In some example embodiments, the time length for monitoring the MSGB is a time length of an MSGB response window.

In some example embodiments, the information of the first device for contention resolution is received via a Msg3 of a random access procedure.

In some example embodiments, the method 600 further comprises: determining the first configuration and the second configuration; and transmitting the first configuration and the second configuration to the first device 110.

In some example embodiments, determining the first configuration comprises: in accordance with a determination that the configuration of the 4-step random access channel is unavailable in the active bandwidth part, determining the first configuration to indicate a contention resolution timer for the active bandwidth part.

In some example embodiments, determining the first configuration comprises: determining the first configuration to indicate a contention resolution timer for the active bandwidth part, regardless of whether the 4-step random access channel is available in the active bandwidth part.

In some example embodiments, the first device 110 comprises a terminal device, and the second device 120 comprises a network device.

In some example embodiments, an apparatus capable of performing the method 500 (for example, the first device 110) may comprise means for performing the respective steps of the method 500. The means may be implemented in any suitable form. For example, the means may be implemented in a circuitry or software module.

In some example embodiments, the apparatus comprises means for receiving, at a first device from a second device, an indication to perform Msg3 transmission; means for transmitting, to the second device, information of the first device for contention resolution; and means for in case a configuration of a 4-step random access channel is unavailable in an active bandwidth part for the first device, determining a duration for monitoring a contention resolution message based on one of: a first configuration of a 2-step random access channel in the active bandwidth part, or a second configuration of a 4-step random access channel in a bandwidth part different from the active bandwidth part.

In some example embodiments, the means for determining the duration comprises: means for in accordance with a determination that the first configuration indicates a contention resolution timer, determining the duration as a time length of the contention resolution timer.

In some example embodiments, the means for determining the duration comprises: means for in case the first configuration does not indicate a contention resolution timer, determining the duration as a time length of a contention resolution timer indicated in the second configuration.

In some example embodiments, the bandwidth part comprises one of the following: an initial bandwidth part for the first device, a default bandwidth part for the first device, a first active bandwidth part for the first device, or a predetermined bandwidth part indicated by the second device.

In some example embodiments, the apparatus further comprises: means for in case the first configuration does not indicate a contention resolution timer, determining the duration as a time length for monitoring a MSGB from the second device, the MSGB being transmitted by the second device in response to a MSGA transmitted over the 2-step random access channel.

In some example embodiments, the time length for monitoring the MSGB is a time length of an MSGB response window.

In some example embodiments, the apparatus further comprises: means for receiving the first configuration and the second configuration from the second device.

In some example embodiments, the first device comprises a terminal device, and the second device comprises a network device.

In some example embodiments, the apparatus further comprises means for performing other steps in some example embodiments of the method 500. In some example embodiments, the means comprises at least one processor; and at least one memory including computer program code, the at least one memory and computer program code configured to, with the at least one processor, cause the performance of the apparatus.

In some example embodiments, an apparatus capable of performing the method 600 (for example, the second device 120) may comprise means for performing the respective steps of the method 600. The means may be implemented in any suitable form. For example, the means may be implemented in a circuitry or software module.

In some example embodiments, the apparatus comprises means for transmitting, at a second device to a first device, an indication to perform Msg3 transmission; means for in case a configuration of a 4-step random access channel is unavailable in an active bandwidth part for the first device, determining a duration for transmitting a contention resolution message to the first device based on one of: a first configuration of a 2-step random access channel in the active bandwidth part, or a second configuration of a 4-step random access channel in a bandwidth part different from the active bandwidth part; and means for in accordance with a determination that information of the first device for contention resolution is received from the first device, transmitting the contention resolution message to the first device within the duration.

In some example embodiments, the means for determining the duration comprises: means for in accordance with a determination that the first configuration indicates a contention resolution timer, determining the duration as a time length of the contention resolution timer.

In some example embodiments, the means for determining the duration comprises: means for in case the first configuration does not indicate a contention resolution timer, determining the duration as a time length of a contention resolution timer indicated in the second configuration.

In some example embodiments, the bandwidth part comprises one of the following: an initial bandwidth part for the first device, a default bandwidth part for the first device, a first active bandwidth part for the first device, or a predetermined bandwidth part indicated by the second device.

In some example embodiments, the apparatus further comprises: means for in case the first configuration does not indicate a contention resolution timer, determining the duration as a time length for the first device to monitor a MSGB from the second device, the MSGB being transmitted by the second device in response to a MSGA transmitted over the 2-step random access channel.

In some example embodiments, the time length for monitoring the MSGB is a time length of an MSGB response window.

In some example embodiments, the apparatus further comprises: means for determining the first configuration and the second configuration; and means for transmitting the first configuration and the second configuration to the first device.

In some example embodiments, the means for determining the first configuration comprises: means for in accordance with a determination that the configuration of the 4-step random access channel is unavailable in the active bandwidth part, determining the first configuration to indicate a contention resolution timer for the active bandwidth part.

In some example embodiments, the means for determining the first configuration comprises: means for determining the first configuration to indicate a contention resolution timer for the active bandwidth part, regardless of whether the 4-step random access channel is available in the active bandwidth part.

In some example embodiments, the first device comprises a terminal device, and the second device comprises a network device.

In some example embodiments, the apparatus further comprises means for performing other steps in some example embodiments of the method 600. In some example embodiments, the means comprises at least one processor; and at least one memory including computer program code, the at least one memory and computer program code configured to, with the at least one processor, cause the performance of the apparatus.

Figure 7:
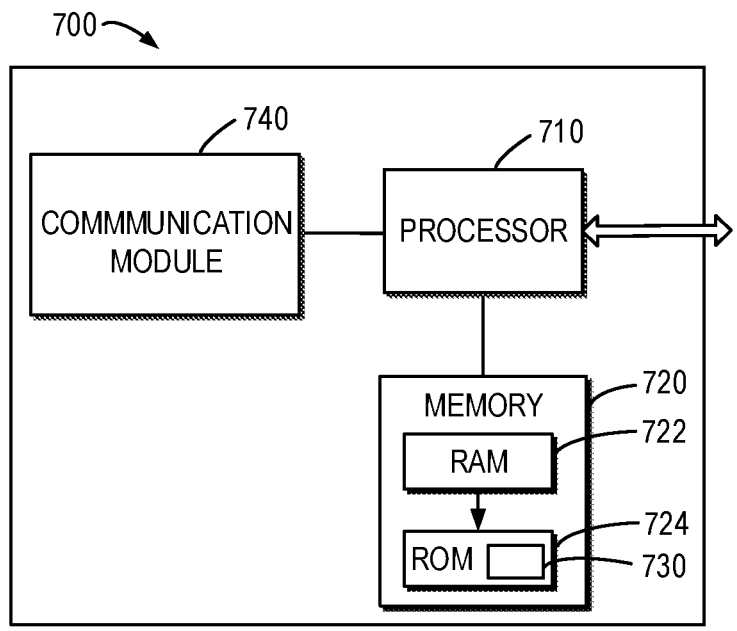
FIG. 7 illustrates a simplified block diagram of a device that is suitable for implementing example embodiments of the present disclosure.

FIG. 7 illustrates a simplified block diagram of a device 700 that is suitable for implementing example embodiments of the present disclosure. The device 700 may be provided to implement a communication device, for example the first device 110 and the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communications. The communication interface may represent any interface that is necessary for communications with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The computer program 730 may be stored in the ROM 724. The processor 710 may perform any suitable actions and processing by loading the computer program 730 into the RAM 722.

The example embodiments of the present disclosure may be implemented by means of the computer program 730 so that the device 700 may perform any process of the disclosure as discussed with reference to FIG. 5 or 6. The example embodiments of the present disclosure may also be implemented by hardware or by a combination of software and hardware.

In some example embodiments, the computer program 730 may be tangibly contained in a computer readable medium which may be included in the device 700 (such as in the memory 720) or other storage devices that are accessible by the device 700. The device 700 may load the computer program 730 from the computer readable medium to the RAM 722 for execution. The computer readable medium may include any types of tangible non-volatile storage, such as ROM, EPROM, a flash memory, a hard disk, CD, DVD, and the like.

Figure 8:
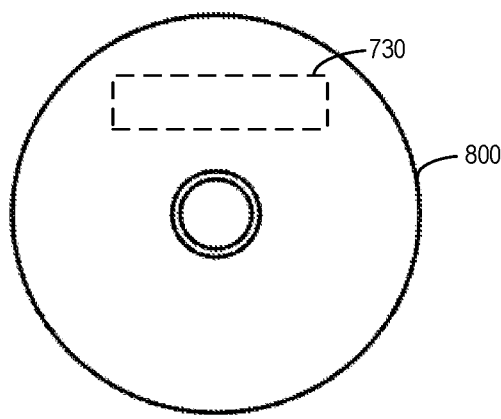
FIG. 8 illustrates a block diagram of an example computer readable medium in accordance with some example embodiments of the present disclosure.

FIG. 8 illustrates a block diagram of an example computer readable medium 800 in accordance with some example embodiments of the present disclosure. In the example of FIG. 8, the computer readable medium 800 is in form of CD or DVD. The computer readable medium 800 has the computer program 730 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIG. 5 or 6. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory storing instructions that, when executed with the at least one processor, cause the first device at least to:
   transmit, to a second device, at least one message according to a first configuration of a 2-step random access channel in an active bandwidth part;
   receive, from the second device in response to the at least one message, an indication to perform Msg3 transmission;
   transmit, to the second device via Msg3, information of the first device for contention resolution;
   based on a determination that a configuration of a 4-step random access channel is not configured in the active bandwidth part for the first device, determine a duration for monitoring for a contention resolution message based on one of:
      the first configuration of the 2-step random access channel in the active bandwidth part, or
      a second configuration of a 4-step random access channel in a bandwidth part that is different from the active bandwidth part; and
   based on a determination that the first configuration indicates a contention resolution timer, determine the duration as a time length of the contention resolution timer,
   wherein the first configuration indicates the contention resolution timer when the configuration of the 4-step random access channel is not configured in the active bandwidth part for the first device, and does not indicate the contention resolution timer when the configuration of the 4-step random access channel is configured in the active bandwidth part for the first device.

2. The first device of claim 1, wherein the at least one memory stores instructions that, when executed with the at least one processor, cause the first device to:
   based on a determination that the first configuration does not indicate the contention resolution timer, determine the duration as a time length of a contention resolution timer indicated in the second configuration.

3. The first device of claim 1, wherein the active bandwidth part comprises one of the following:
   an initial bandwidth part for the first device,
   a default bandwidth part for the first device,
   a first active bandwidth part for the first device, or
   a predetermined bandwidth part indicated by the second device.

4. The first device of claim 1, wherein the at least one memory stores instructions that, when executed with the at least one processor, cause the first device to:
   based on a determination that the first configuration does not indicate the contention resolution timer, determine the duration as a time length for monitoring a MSGB from the second device, wherein the MSGB comprises a message transmitted by the second device in response to a MSGA transmitted over the 2-step random access channel, wherein the at least one message comprises, at least, the MSGA.

5. The first device of claim 4, wherein the time length for monitoring the MSGB is a time length of an MSGB response window.

6. The first device of claim 1, wherein the at least one memory stores instructions that, when executed with the at least one processor, cause the first device to:
   receive the first configuration or the second configuration from the second device.

7. The first device of claim 1, wherein the first device comprises a terminal device, and the second device comprises a network device.

8. The first device of claim 1, wherein the contention resolution message comprises a contention resolution message in response to the information of the first device transmitted via Msg3, wherein the at least one memory stores instructions that, when executed with the at least one processor, cause the first device to:
   monitor for the contention resolution message, in the active bandwidth part and according to the first configuration, for the determined duration.

9. A second device comprising:
   at least one processor; and
   at least one memory storing instructions that, when executed with the at least one processor, cause the second device to:
   receive, from a first device, at least one message according to a first configuration of a 2-step random access channel in an active bandwidth part;
   transmit, to the first device in response to the at least one message, an indication to perform Msg3 transmission;
   based on a determination that a configuration of a 4-step random access channel is not configured in the active bandwidth part for the first device, determine a duration for transmitting a contention resolution message to the first device based on one of:
      the first configuration of the 2-step random access channel in the active bandwidth part, or
      a second configuration of a 4-step random access channel in a bandwidth part that is different from the active bandwidth part;
   based on a determination that the first configuration indicates the contention resolution timer, determine the duration as a time length of the contention resolution timer; and
   based on a determination that information of the first device for contention resolution is received from the first device via Msg3, transmit the contention resolution message to the first device within the duration,
   wherein the first configuration indicates the contention resolution timer when the configuration of the 4-step random access channel is not configured in the active bandwidth part for the first device, and does not indicate the contention resolution timer when the configuration of the 4-step random access channel is configured in the active bandwidth part for the first device.

10. The second device of claim 9, wherein the at least one memory stores instructions that, when executed with the at least one processor, cause the second device to:
    based on a determination the first configuration does not indicate the contention resolution timer, determine the duration as a time length of a contention resolution timer indicated in the second configuration.

11. The second device of claim 9, wherein the active bandwidth part comprises one of the following:
    an initial bandwidth part for the first device,
    a default bandwidth part for the first device,
    a first active bandwidth part for the first device, or
    a predetermined bandwidth part indicated by the second device.

12. The second device of claim 9, wherein the at least one memory stores instructions that, when executed with the at least one processor, cause the second device to:

based on a determination that the first configuration does not indicate the contention resolution timer, determine the duration as a time length for the first device to monitor a MSGB from the second device, wherein the MSGB comprises a message transmitted by the second device in response to a MSGA transmitted over the 2-step random access channel, wherein the at least one message comprises, at least, the MSGA.

13. The second device of claim 12, wherein the time length for monitoring the MSGB is a time length of an MSGB response window.

14. The second device of claim 9, wherein the at least one memory stores instructions that, when executed with the at least one processor, cause the second device to:

determine the first configuration or the second configuration; and transmit the first configuration or the second configuration to the first device.

15. The second device of claim 14, wherein the at least one memory stores instructions that, when executed with the at least one processor, cause the second device to:

based on a determination that the configuration of the 4-step random access channel is not configured in the active bandwidth part, cause the first configuration to indicate the contention resolution timer for the active bandwidth part.

16. The second device of claim 14, wherein the at least one memory stores instructions that, when executed with the at least one processor, cause the second device to:

cause the first configuration to indicate the contention resolution timer for the active bandwidth part.

17. The second device of claim 9, wherein the first device comprises a terminal device, and the second device comprises a network device.

18. A method comprising:

transmitting, with a first device to a second device, at least one message according to a first configuration of a 2-step random access channel in an active bandwidth part;

receiving, from the second device in response to the at least one message, an indication to perform Msg3 transmission;

transmitting, to the second device via Msg3, information of the first device for contention resolution; and based on a determination that a configuration of a 4-step random access channel is not configured in the active bandwidth part for the first device, determining a duration for monitoring for a contention resolution message based on one of:

the first configuration of the 2-step random access channel in the active bandwidth part, or a second configuration of a 4-step random access channel in a bandwidth part that is different from the active bandwidth part; and based on a determination that the first configuration indicates a contention resolution timer, determining the duration as a time length of the contention resolution timer, wherein the first configuration indicates the contention resolution timer when the configuration of the 4-step random access channel is not configured in the active bandwidth part for the first device, and does not indicate the contention resolution timer when the configuration of the 4-step random access channel is configured in the active bandwidth part for the first device.

* * * * *